United States Patent

[11] 3,553,442

| [72] | Inventor | Emanuel S. Weisbart<br>New York, N.Y. |
|---|---|---|
| [21] | Appl. No. | 657,592 |
| [22] | Filed | Aug. 1, 1967 |
| [45] | Patented | Jan. 5, 1971 |
| [73] | Assignee | Efficient Instruments Corporation<br>Long Island City, N.Y. |

[54] TAXI PASSENGER DETECTION ARRANGEMENT
10 Claims, 4 Drawing Figs.

[52] U.S. Cl. ..................................................... 235/92,
235/30
[51] Int. Cl. ...................................................... G07b 13/00
[50] Field of Search ............................................ 235/92,
27.1, 36, 61, 30, 98; 346/15

[56] References Cited
UNITED STATES PATENTS

| 2,934,159 | 4/1960 | Butler............................ | 180/82 |
| 3,325,097 | 6/1967 | Slutsky......................... | 235/30 |
| 3,386,651 | 6/1968 | Wallqvist...................... | 235/30 |

Primary Examiner—Maynard R. Wilbur
Assistant Examiner—Joseph M. Thesz, Jr.

Attorney—Michael S. Striker

ABSTRACT: An electronic arrangement for actuating a taximeter within a taxicab, when either the rear seat or front seat of the taxicab becomes occupied. Electromagnetic coils are mounted within the rear and front seats and located with respect to each other so that when either one of the seats becomes occupied, electrical signals become transmitted from the coils. The signals originating from the electromagnetic coils are amplified, rectified, and filtered to obtain suitable DC signals for actuating control circuitry. A solid state logic circuit accepts the DC signals representing the occupancy of either the rear or front seats, and transmits an actuating signal to a timing circuit which includes a delay of 25 seconds before a corresponding signal is generated through this timing circuit. The solid state logic circuit has provision whereby the actuating signal to the timing circuit is transmitted only when the signals originating from either the rear or front seats of the taxicab, are above a predetermined level. The solid state logic circuit also has provision whereby the timing circuit is actuated when the signals originating from either the rear or front seats are below a predetermined level. After the elapse of 25 seconds, determined by the timing circuit, a trigger circuit actuates the taximeter provided the latter has not already been actuated previously.

PATENTED JAN 5 1971

3,553,442

INVENTOR
Emanuel S. Weisbart
BY
Michael S. Striker
ATTORNEY

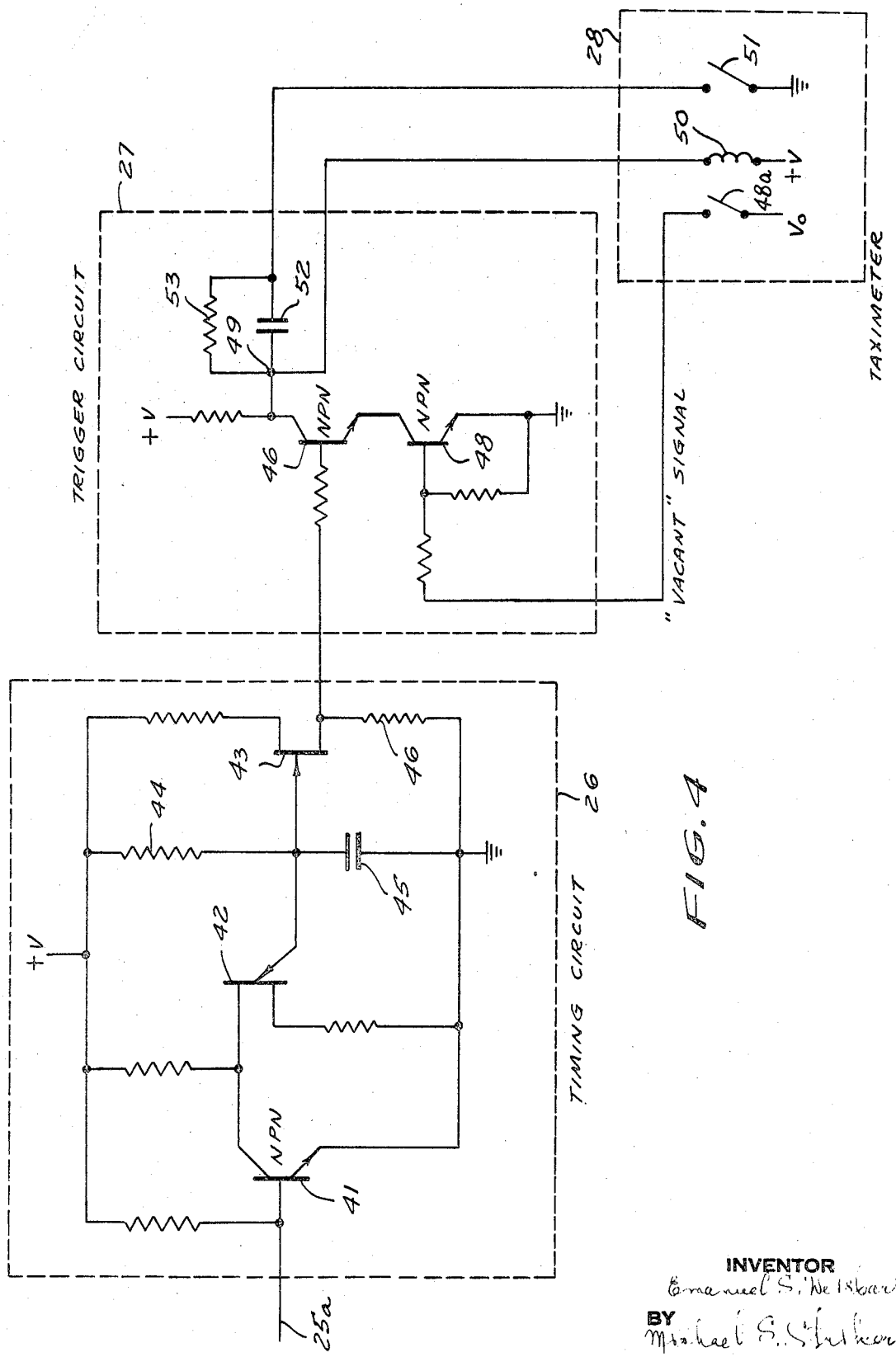

3,553,442

TAXI PASSENGER DETECTION ARRANGEMENT

BACKGROUND OF THE INVENTION

At times, governmental agencies utilize the record of gross receipts registered in the taximeter as a basis for the collection of taxes. Furthermore, when in a taxicab, the ownership is divided between two separate parties having independent and divided interests there is often the tendency for the taxicab driver or operator to transport a passenger without having the taximeter register the fare. To overcome this problem the present invention provides an electronic circuit for automatically actuating the taximeter when any person is seated on either the rear or front seats of the taxicab. The sensing devices within the rear and front seats are of electromagnetic construction. Each seat has mounted into it a set of cooperating electromagnetic coils which are separated by a predetermined distance when the seat is unoccupied. When a passenger becomes seated onto one of the seats, the set of cooperating coils becomes located closer together so that the magnetic circuit linking the set of coils can induce a voltage of higher levels within the output coil of the sensing device. The signals originating from the sensing devices within the rear and front seats are suitably processed and amplified and after an elapse of 25 seconds, they are applied to actuate the taximeter. The 25 second delay is inserted into the system to assure that the taximeter does not become actuated in the event that the person does not immediately leave the taxicab after having entered it.

The arrangement, in accordance with the present invention also has provision for actuating the taximeter in the event that any of the external wiring of the electronic arrangement becomes severed, shorted, or inoperative as a result of misuse or tampering. For this purpose the present invention includes a detection circuit which provides the signal when the signal flow within the arrangement drops below a predetermined level.

The arrangement, in accordance with the present invention also has provision whereby actuation of the taximeter cannot be inhibited by maintaining the manual actuation switch, on the taximeter, depressed.

SUMMARY OF THE INVENTION

A set of cooperating electromagnetic coils are mounted within the rear seat and front seat. The cooperating electromagnetic coils constitute primary and secondary windings. The primary windings are energized by an oscillator which gives rise to a magnetic circuit from the primary windings. These magnetic circuits, in turn, link the secondary windings and induce therein voltage signals. When a seat of the taxicab is unoccupied, the primary and secondary windings of the electromagnetic sensing device are separated from each other by a predetermined distance. As a result of this separation, a voltage signal of a relatively low level is induced in the secondary winding of the sensing device. When, on the other hand, the seat becomes occupied, by a passenger, the primary and secondary windings of the sensing device become located closer to each other, and as a result the magnetic circuit links the secondary windings with a greater flux density. The latter serves to induce the relatively high voltage signal within the secondary for purposes of indicating that the seat has been occupied.

The AC signals originating from the secondary coils of the sensing devices within the seats of the taxicab, are rectified and filtered to obtain corresponding DC signals suitable for actuating logic circuitry. The latter processes the DC signals to determine whether they are either above or below the predetermined levels for actuating the taximeter. When the signals applied to the logic circuitry are indeed above or below the predetermined levels, the logic circuitry transmits a signal to the timing circuit for the purpose of actuating the taximeter after the elapse of 25 seconds. A trigger circuit is interposed between the timing circuit and taximeter to inhibit an actuating signal to the taximeter when the latter has already been previously actuated, or is in the operating state.

The novel features which are considered as characteristic for the invention are set forth in particular in the appended claims. The invention itself, however, both as to its construction and its method of operation, together with additional objects and advantages thereof, will be best understood from the following description of specific embodiments with reference to the accompanying drawing.

BRIEF DESCRIPTION OF THE DRAWING

FIG. 4 is an electrical schematic diagram and shows the structure of the timing circuit as well as the trigger circuit for actuating the taximeter under the designated conditions.

DESCRIPTION OF THE PREFERRED EMBODIMENTS

Figure 1:
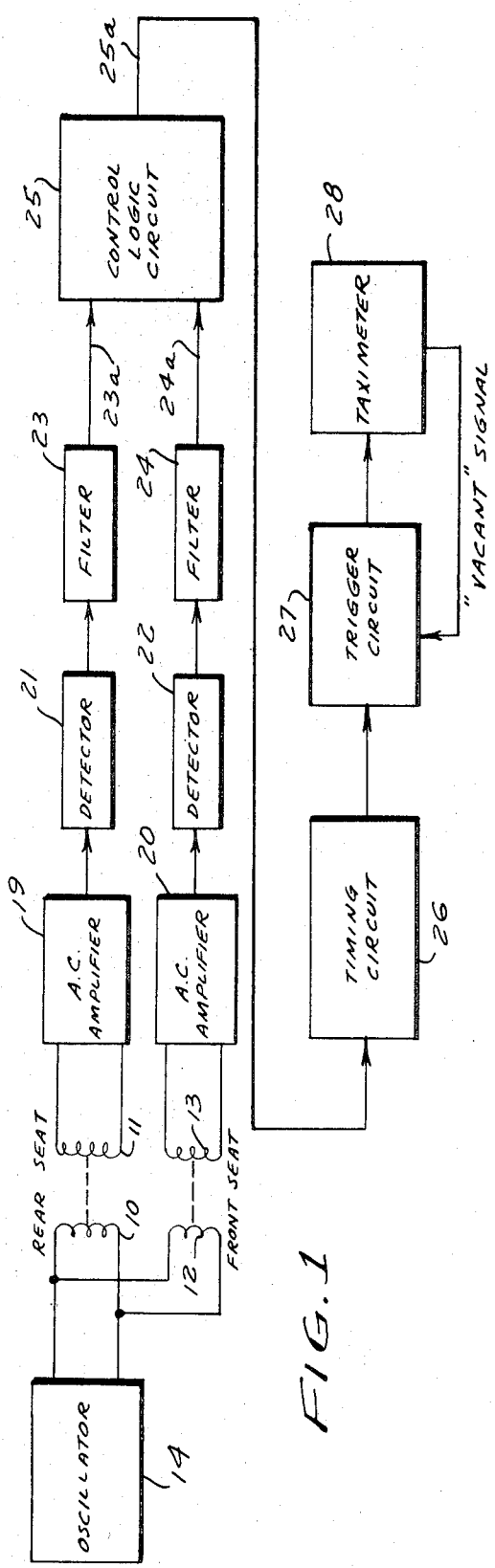
FIG. 1 is a functional schematic diagram and shows the electronic arrangement for actuating a taximeter automatically when the rear or front seat of the taxicab becomes occupied, in accordance with the present invention.

Referring to the drawing, the rear and front seats of the taxicab are equipped with electromagnetic sensing devices each having primary and secondary coils. Thus, the rear seat has mounted within it the electromagnetic device comprised of coils 10 and 11, as well as 10a and 11a, linked to each other through a magnetic path. The corresponding coils mounted within the front seat of the taxicab are denoted by reference numerals 12 and 13. The primary windings 10, 10a and 12 of the electromagnetic sensing devices are energized by an oscillator circuit 14. In this manner, a continuous AC signal is impressed on the primary windings 10, 10a and 12.

The coils 10 and 11, 10a and 11a, or 12 and 13 are mounted within the seat of the taxicab so that they are separated from each other by a predetermined distance, when the seat is not occupied by a passenger. Under those conditions the magnetic flux linking the secondary coil 11, 11a or 13, is at a minimum, and therefore the voltage induced within the secondary coils is of minimum magnitude.

Figure 2:
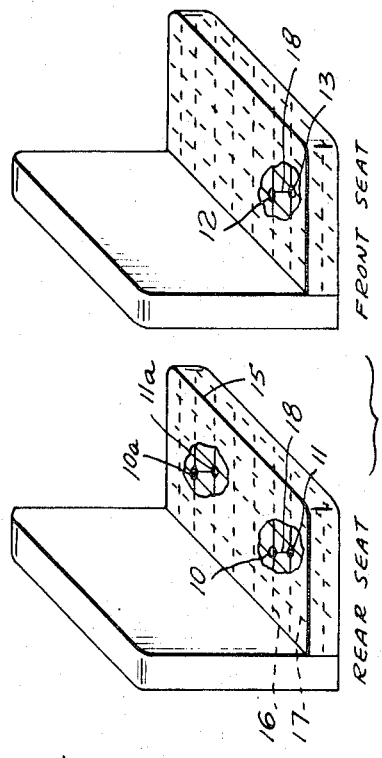
FIG. 2 is an isometric view of either the rear or front seat of the taxicab, and shows the manner in which the electromagnetic sensing device is mounted within the seat of the taxicab.

When, on the other hand, a passenger is seated on the seat containing the sensing device, the secondary coil as for example, coil 11, becomes located closer to the primary coil 10. As a result a greater amount of magnetic flux links coil 11 and a larger voltage is thereby induced in the secondary. The physical configuration governing the mounting of the coils within the seat of the taxicab may be seen from FIG. 2.

Thus, in a typical taxicab seat 15, a supporting grid 16 is mounted near the upper surface of the seat directly beneath the surface covering. A lower grid 17 is mounted near the base of the seat directly beneath the grid 16. The two grids are generally maintained separated from each other by a plurality of springs distributed throughout the area of the seat. In this manner a passenger may be comfortably seated on the seat without experiencing shocks or vibrations which may occur when the taxicab rides over irregularities on the road surface. For purposes of maintaining the diagram simplified, these springs, generally compression springs, are not shown. The electromagnetic sensing device is mounted within this seat 15, by attaching one coil as, for example, the primary coil 10, to the upper grid 16. The secondary coil 11 is secured to the lower grid 17. Accordingly, when the seat is unoccupied, a predetermined distance 18 prevails between the two coils. When, on the other hand, a passenger becomes seated upon the seat 15, the upper surface of the seat becomes depressed so that the grid 16 is lowered. As a result, the grid 16 becomes physically closer to the grid 17 thereby reducing the distance 18. The coils 10 and 11 are therefore brought closer together and the magnetic flux generated by the primary windings will link with greater density, the secondary winding. The latter will thereby have induced within it a larger voltage signal due to the AC signal prevailing in the primary winding.

The induced voltages from the secondary windings are suitably amplified by the AC amplifiers 19 and 20, so that they may be processed further to provide controlling signals. The AC signals from amplifiers 19 and 20 are then rectified by the detectors 21 and 22. These detectors are standard rectifiers which may be readily obtained commercially. They serve the sole purpose of converting the AC signals from amplifiers 19 and 20 into corresponding DC signals. The amplifiers 19 and 20 are of standard construction and may also be readily obtained commercially.

To assure substantially smooth DC signals, filters 23 and 24 are provided. These filters are well known in the art and commercially available. They remove the ripple and harmonics from the signals realized from the detectors, to yield substantially pure DC signals. The DC signals are then applied to the control logic circuit 25 which is of solid state construction.

The control logic circuit 25 examines the DC signals applied to it by the filters 23 and 24, to determine whether they are above or below predetermined voltage levels. When, in fact, the conditions exist where the applied signals are above or below these predetermined voltage levels, the control logic circuit 25 emits a signal to the timing circuit 26.

The timing circuit 26 delays the signals applied to it from control logic circuit 25 to assure that the taximeter is not actuated in the event that the seat has a shock applied to it from irregularities in the road when the taxicab is unoccupied. Accordingly the timing circuit delays the signal applied to it by approximately 25 seconds. This delay also accommodates the condition when a passenger momentarily becomes seated in the taxicab and then leaves again without being transported. Thus erroneous actuation of the taximeter is inhibited through the timing circuit 26.

The trigger circuit 27 accepts the signal from the timing circuit 26 and actuates therewith the taximeter 28. This actuation of the taximeter is, however, inhibited when the latter is already in the operating state by having been actuated previously. Thus, when the taximeter 28 is in the operating state so that it registers the fare, the "vacant" signal is no longer applied by the taximeter to the trigger circuit 27, and as a result the taximeter cannot be actuated by the latter.

Figure 3:
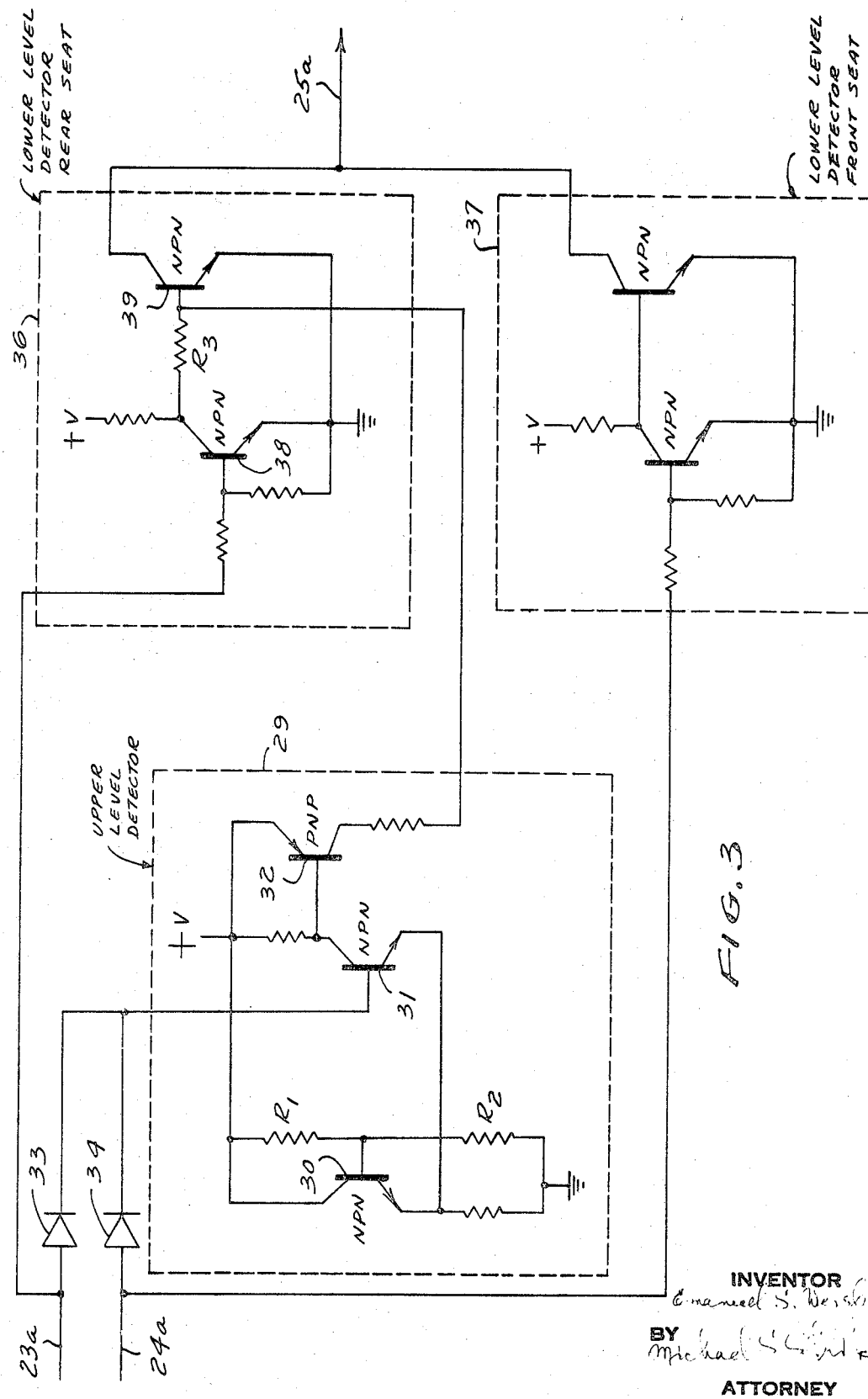
FIG. 3 is an electrical schematic diagram of the solid state logic circuitry for processing the signals originating from the sensing devices within the seats of the taxicab.

The structural details of the control logic circuit 25 are shown in FIG. 3. The control logic circuit 25 consists essentially of three functional circuits, the upper level detector, and two lower level detectors.

The upper level detector 29 includes two NPN transistors 30 and 31, and a PNP transistor 32. The signals 23a and 24a from the filters 23 and 24, respectively, are applied to the base of the transistor 31, through the diodes 33 and 34. These diodes serve the purpose of isolating the two signals 23a and 24a from each other so that one does not interrupt with the other and that they may each separately actuate the base of transistor 31. The emitter of the transistor 31 is biased through the circuit including transistor 30. The latter circuit includes resistors $R_1$, $R_2$ interconnected to form a voltage divider. As a result of this voltage dividing circuit, combined with transistor 30, the transistor 31 will conduct when the potential of its base is above a predetermined value. This potential of the base of transistor 31 is determined by either a signal 23a or 24a, from the filters 23 and 24, respectively. Accordingly, transistor 31 becomes conductive whenever the signals applied by the filters 23 and 24 are above a predetermined value.

The collector of transistor 31 is connected to the base of transistor 32. In view of the condition that transistor 31 is of the NPN-type, and transistor 32 is of the PNP-type, transistor 32 will also conduct when transistor 31 is in the conducting state. The collector of transistor 32 is, in turn, connected to the base of transistor 39 in the lower level detector 36. In view of the condition that transistor 39 is connected as an NPN transistor whereas transistor 32 is a PNP transistor, transistor 39 will also conduct when a transistor 32 is in the conducting state. Accordingly a signal will appear at the output 25a at the control logic circuit 25, whenever a signal provided by either filter 23 or 24 is above a predetermined level. It should be noted that only one upper level detector is required to take into account the states of occupancy of the rear and front seats of the taxicab.

In the event that any connections leading to the input terminals of the control logic circuit 25, are severed or shorted, the inputs 23a and 24a (output of filters 23 and 24) drop below a predetermined level. For the purpose of detecting such drops in voltage level, the lower level detectors 36 and 37 are provided. The detector circuit 36 operates in conjunction with the rear seat while the detector circuit 37 operates in conjunction with a front seat. The two detector circuits 36 and 37 are identical in construction with the exception of resistor $R_3$ provided for accommodating the output of transistor 32. Thus, the description with respect to the operation of the detector circuit 36 applies equally well to the detector circuit 37.

The detector circuit 36 includes two NPN transistors 38 and 39. The signal from the input 23a is applied to the base of the transistor 38. When, now, this signal applied to the base of transistor 38 drops below the predetermined level determined by the biasing of this transistor, the latter is cut off. As a result, the transistor 39 whose base is controlled by the collector of transistor 38, is turned on or becomes conductive. With the turning on of transistor 39, then, the signal drops at the output 25a for the purpose of actuating the taximeter 28. The signal will drop at the output 25a, therefore, whenever either one of the signals 23a and 24a are above or below predetermined values. The upper levels of the signals are processed by the detector circuit 29, whereas the lower levels of the signals are examined and acted upon by the detector circuits 36 and 37.

FIG. 4 shows in detail the timing and trigger circuits, as well as the control circuitry, within the taximeter, which is operatively connected to the trigger circuit. The timing circuit 26 is actuated by the output 25a of the lower level detector circuits 36 and 37. The timing circuit includes an NPN transistor 41 and two unijunction transistors 42 and 43. Connected into the circuit is, in addition, a resistor 44 and a capacitor 45, for the purpose of establishing the timing interval.

When a signal drops at the output 25a due to the condition that transistor 39, for example, is in the conductive state, and transistor 41 is cut off, unijunction 42 is set to an emitter firing level higher than capacitor 45 can provide. Capacitor 45 commences to charge, through resistor 44. Upon the elapse of 25 seconds determined by the firing level set by unijunction 43, the RC product of resistors 44 and capacitor 45, the latter discharges through the resistor 46. Discharge of a capacitor 45 cannot occur through the left circuit loop connected to the capacitor, because unijunction 42 is set to a higher firing level than unijunction 43.

The discharge of the capacitor 45 after the 25 second interval in this manner, causes transistor 46 within the trigger circuit 27 to conduct. Providing the taxicab is vacant as evidenced by the roof light of the taxicab, the switching contact 48a within the taximeter is closed. This condition then assures that transistor 48 is in the conductive state. With transistors 46 and 48 both in the conductive state, the junction 49 is at ground potential because transistors 46 and 48 are connected in series. As a result, the relay coil 50 within the taximeter is energized and the taximeter is thereby actuated. This actuation of the meter then permits the latter to commence registering the fare.

In the commonly used taximeter it is also desirable to provide a switch 51 which may be manually depressed for the purposes of actuating the taximeter. Accordingly the switch 51 is connected to the circuit of the present invention, so that it leads to the junction 49 via the capacitor 52. Thus, when the switching contact 51 is momentarily depressed manually by the taxicab driver, the junction point 49 acquires ground potential thereby energizing the relay coil 50.

It should be noted that if the capacitor 52 were not present the switching contact 51 could be maintained depressed and this would prevent any further actuation of the taximeter. To avoid this condition, the capacitor 52 is inserted into the circuit so as to isolate the switch 51 from the junction 49 after momentary contact of the switch 51 has been carried out.

Thus, the capacitor 52 allows the switching contact 51 to momentarily connect junction 49 to ground, for the purpose of energizing relay 50, afterwards, however, the capacitor isolates the switching contact 51 effectively so as to prevent junction 49 from being locked to ground. The resistor 53 bridging the capacitor 52 serve the purpose of discharging the capacitor so that a new cycle can commence after the capacitor 52 has been charged through the actuation of switch 51.

It will be understood that each of the elements described above, or two or more together, may also find a useful application in other types of taximeters differing from the types described above.

I claim:

1. A control arrangement for actuating a taximeter comprising, in combination, detecting means mounted within the taxi for detecting the presence of a passenger therein; signal processing means connected to said detecting means and receiving a signal from said detecting means when a passenger is present within the taxi; circuit failure means within said signal processing means for detecting circuit failure between said detecting means and said signal processing means; timing means connected to said signal processing means and receiving therefrom a signal when said processing means has determined that said detecting means has detected in the desired manner the presence of a passenger within the taxi, or said circuit failure means has detected circuit failure between said detecting means and said signal processing means, said timing means providing an output signal a predetermined time interval after said timing means receives a signal from said signal processing means; and actuating means connected to said timing means and receiving therefrom said output signals for actuating said taximeter, whereby the latter is automatically actuated for registering the taxi fare a predetermined time interval after a passenger has entered the taxi.

2. The control arrangement as defined in claim 1, wherein said detecting means is an electromagnetic device providing a voltage signal when a passenger is present within the taxicab.

3. The control arrangement as defined in claim 2, including amplifying means for amplifying the voltage signal provided by said electromagnetic detecting device.

4. The control arrangement as defined in claim 2, including voltage level detecting means within said circuit failure means for providing a signal output when the voltage signal from said electromagnetic detecting device is above a predetermined level.

5. The control arrangement as defined in claim 12, including low voltage level detecting means within said circuit failure means for detecting when the voltage signal from said electromagnetic detecting device is below a predetermined level.

6. The control arrangement as defined in claim 1, wherein said timing means includes a resistor capacitor network for determining said predetermined time interval.

7. The control arrangement as defined in claim 1, including inhibiting means within said actuating means for inhibiting actuation of said taximeter when the taxi is in an occupied state.

8. The control arrangement as defined in claim 1, including means for preventing manual actuation of said taximeter from inhibiting automatic actuation of said taximeter by said actuating means.

9. The control arrangement as defined in claim 1, wherein said detecting means is mounted within the seats of the taxi.

10. A control arrangement for actuating a taximeter comprising, in combination, detecting means mounted within a taxi for detecting the presence of a passenger therein; signal processing means connected to said detecting means and receiving a signal from said detecting means when a passenger is present within the taxi; timing means connected to said signal processing means and receiving therefrom a signal when said processing means has determined that said detecting means has detected in the desired manner the presence of a passenger within the taxi, said timing means providing an output signal a predetermined time interval after said timing means receives a signal from said signal processing means; actuating means connected to said timing means and receiving therefrom said output signals for actuating said taximeter, whereby the latter is automatically actuated for registering the taxi fare a predetermined time interval after a passenger has entered the taxi, said detecting means being an electromagnetic device providing a voltage signal when a passenger is present within said taxicab; amplifying means for amplifying the voltage signal provided by said electromagnetic detecting device; and rectifying means connected between said amplifying means and said signal processing means for rectifying the signal from said amplifying means and applying a rectifying signal to said signal processing means.